(12) United States Patent
Cardoso

(10) Patent No.: US 10,823,685 B2
(45) Date of Patent: Nov. 3, 2020

(54) METHOD AND SYSTEM TO AUTOMATICALLY INSPECT PARTS USING X-RAYS

(71) Applicant: Guilherme Cardoso, Carlsbad, CA (US)

(72) Inventor: Guilherme Cardoso, Carlsbad, CA (US)

(73) Assignee: CREATIVE ELECTRON, INC., San Marcos, CA (US)

(*) Notice: Subject to any disclaimer, the term of this patent is extended or adjusted under 35 U.S.C. 154(b) by 157 days.

(21) Appl. No.: 16/249,855

(22) Filed: Jan. 16, 2019

(65) Prior Publication Data

US 2019/0219525 A1    Jul. 18, 2019

Related U.S. Application Data

(60) Provisional application No. 62/618,035, filed on Jan. 16, 2018.

(51) Int. Cl.
*G01N 23/083* (2018.01)
*G06N 20/00* (2019.01)

(52) U.S. Cl.
CPC ........... *G01N 23/083* (2013.01); *G06N 20/00* (2019.01); *G01N 2223/401* (2013.01); *G01N 2223/6113* (2013.01)

(58) Field of Classification Search
CPC ......... G01N 23/083; G01N 2223/6113; G01N 2223/401; G01N 3/0454; G06N 20/00
USPC .......................................................... 378/62
See application file for complete search history.

(56) References Cited

U.S. PATENT DOCUMENTS

| | | | |
|---|---|---|---|
| 2018/0146935 A1* | 5/2018 | Song | A61B 6/4014 |
| 2019/0046145 A1* | 2/2019 | Leghissa | G06T 7/30 |
| 2019/0150864 A1* | 5/2019 | Flohr | A61B 6/4241 |
| 2019/0156484 A1* | 5/2019 | Nye | G16H 50/20 |
| 2019/0164285 A1* | 5/2019 | Nye | G06T 7/70 |
| 2020/0065940 A1* | 2/2020 | Tang | G06T 3/40 |
| 2020/0155870 A1* | 5/2020 | Takahashi | A61N 5/10 |

* cited by examiner

*Primary Examiner* — David P Porta
*Assistant Examiner* — Gisselle M Gutierrez

(57) ABSTRACT

A system and method for automating programming of an industrial use x-ray inspection machine, utilizing an artificial intelligence (AI) engine in both a navigator level and planner level stage of an x-ray parts inspection machine, the AI engine performing at least one of identifying and classifying a sample, assessing location(s) to be inspected on the sample, and implementing a test criteria for each assessed location on the sample. The AI engine removes the typical interactions and setup procedures performed by the machine operator, thus enabling a higher degree of system automation and accuracy.

16 Claims, 3 Drawing Sheets

METHOD AND SYSTEM TO AUTOMATICALLY INSPECT PARTS USING X-RAYS

CROSS-REFERENCE TO RELATED APPLICATION(S)

This application claims the benefit of U.S. Provisional Patent Application No. 62/618,035, filed Jan. 16, 2018, the contents of which is hereby incorporated by reference in its entirety.

FIELD

This invention relates to x-ray inspection systems. More particularly, it relates to an automated approach for parts inspection using x-ray inspection machines.

BACKGROUND

The prior art method to automatically inspect parts using x-rays requires multiple steps by an operator to program the inspecting x-ray machine to navigate the section(s) on the sample being inspected. While some systems use an x-ray or visual image of the entire sample, the operator must still "move" to the targeted section being inspected. Once these inspection locations have been identified, the operator must determine the type of defects that can occur at that specific location. Upon determination of the types of defects in that location, the operator must set proper thresholds to determine if the test is a pass or fail.

All of these steps involve operator time, effort, and possible "operator-error" scenarios. For each different sample type, the above operational efforts must be repeated. What would be desired in the industry is an automated (or semi-automated) system and/or method for setting-up the inspection process, eliminating one or more of the steps elucidated above. Various systems and/or methods for addressing such deficiencies in the art are detailed below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a method for automating programming of an industrial use x-ray inspection machine is provided, comprising: utilizing an artificial intelligence (AI) engine in both a navigator level and planner level stage of an x-ray parts inspection machine, the AI engine performing: at least one of identifying and classifying a sample; assessing location(s) to be inspected on the sample; and implementing a test criteria for each assessed location on the sample.

In another aspect of the disclosed embodiments, the method above is provided, further comprising AI engine instructions to the x-ray machine for: moving the sample in the x-ray machine to the assessed location(s); and generating an x-ray image of the assessed location(s); and/or further comprising applying the generated x-ray images to the test criteria to determine a quality level of the sample; and/for further comprising generating a report of the sample inspection; and/or wherein x-ray machine operation information and at least one of sample identity, sample classification, sample inspection location, and sample test criteria information is communicated to the AI engine from a remote database; and/or wherein information gathered from the sample inspection is communicated to the remote database; and/or wherein x-ray machine operation information and at least one of sample identity, sample classification, sample inspection location, and sample test criteria information is communicated locally a resident AI engine on the x-ray inspection machine; and/or wherein information gathered from the sample inspection is communicated to the local AI engine.

In yet another aspect of the disclosed embodiments, a system for automatic programming of an industrial use x-ray inspection machine is provided, comprising: an artificial intelligence (AI) engine in both a navigator level and planner level stage of an x-ray parts inspection machine, the AI engine having information for: at least one of the identity and classification of a sample; an assessed location(s) to be inspected on the sample; and a test criteria for each assessed location on the sample.

In yet another aspect of the disclosed embodiments, the above system is provided, further comprising AI engine instructions to the x-ray machine to: move the sample in the x-ray machine to the assessed location(s); and generate an x-ray image of the assessed location(s); and/or further comprising an imager level stage, the imager level stage generating x-ray images; and/or further comprising an analyzer level stage, the analyzer level stage comparing the generated x-ray images to the test criteria to determine a quality level of the sample; and/or further comprising a reporting module, reporting quality level of the sample; and/or further comprising a remote database, wherein x-ray machine operation information and at least one of sample identity, sample classification, sample inspection location, and sample test criteria information is communicated to the AI engine from the remote database; and/or wherein information gathered from the sample inspection is communicated to the remote database; and/or wherein the AI engine is resident on the x-ray inspection machine.

DETAILED DESCRIPTION

X-ray machines are commonly used for inspecting industrial or commercial parts using x-rays, particularly for products that are electronic in nature. For example, Creative Electron's TruView x-ray machine provides high speed inspection of "parts" using x-ray image comparisons against a "passing grade" image. Various other companies such as Yxlon, Safeline, Nicolet and so for in the industry utilize similar x-ray inspection procedures. All these systems incorporate the same initial programing steps. Specifically, for a given product type, each of these machines require multiple steps by an operator to program the inspecting x-ray machine to navigate to the section(s) on the sample being inspected. Once these inspection locations have been identified, the operator must determine the type of defects that can occur at that specific location. For example, if the sample is a printed circuit board (PCB) and the location under inspection is a ball-grid array (BGA) part, the types of defects one would be looking for, for example, are voiding in the solder balls, shorts between balls and open or missing balls. Upon determination of the types of defects in that location, the operator must set proper thresholds to determine if the test is a pass or fail. Using the above example, a void larger than 25% in a solder ball may be considered a fail, while voids below 25% are considered pass. It is apparent that a great deal of manual effort and "setup" is needed for the conventional approach to inspecting parts.

Figure 1:
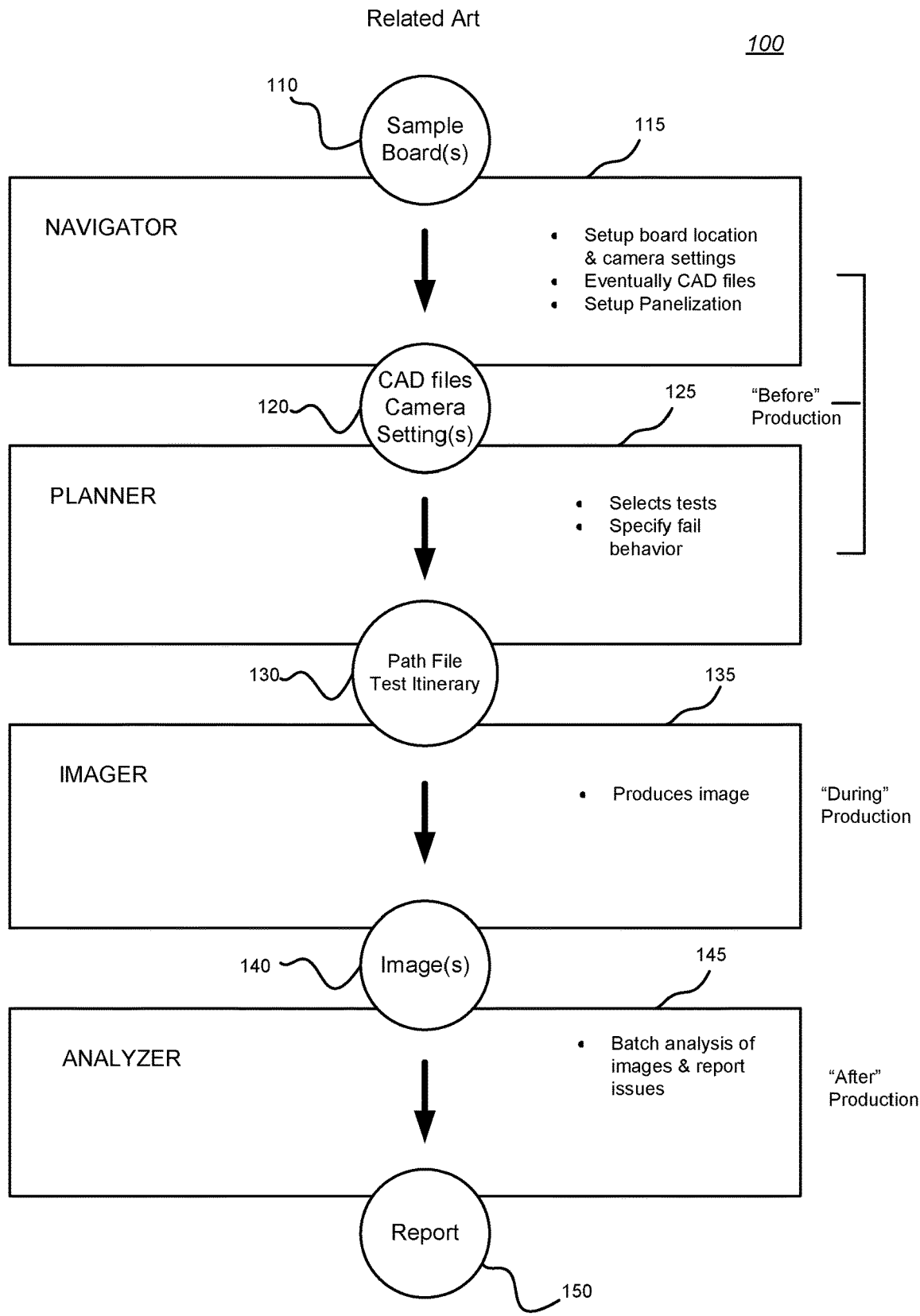
FIG. 1 is a flow diagram showing a related art approach for x-ray parts inspection.

FIG. 1 shows related-art steps 100 for operator-initiated inspection for a typical x-ray inspection machine. These steps are categorized for explanation purposes and while explained in the order below, it is understood that some steps may be combined, abbreviated, altered, etc. depending on the x-ray machine's capabilities and operator's preference. Thus, the following steps are the believed to be the "simplest" arrangement of operations when configuring an x-ray inspection machine for sample inspection.

The first step 115 is called here the "Navigator," which allows the operator to determine the locations in a sample board 110 (or sample object) where the x-ray machine needs to go to collect images. These are the locations of the parts that may fail, such as ball grid arrays (BGAs), etc. In this stage, the operator can use the machine's joystick or controller to navigate to each location of interest on the sample 110 and save those coordinates in the x-ray machine. The system can also store the necessary x-ray machine parameters for that given inspection scenario so that an equivalent image (using the prior machine parameters) can be taken from the next samples the operator inserts in the x-ray machine. These parameters include the location of the position actuators in the x-ray machine, as well as the voltage and current in the x-ray source and image parameters in the x-ray sensor. If available, the CAD data 120 for the sample can be used in this stage to assist in the programming of the x-ray machine. The output of this stage is a series of locations in the sample where the x-ray machine must go to take an x-ray image and the parameters associated with each image.

The next step in the programming of the x-ray machine is the "Planner" stage 125. In this stage 125, the operator must determine what tests are to be performed in each of the locations previously collected in the "Navigator" stage 115. This is also the stage where the operator must set the pass and fail thresholds for each of the tests programmed. A path file 130 with the pass/fail thresholds and test itinerary is generated for use in the subsequent step (Imager 135). The Navigator 115 and Planner 125 stages generally referred to in the industry as the "before" production stages.

Once the operator has programmed the locations where images must be taken (Navigator 115) and the tests to be performed with the pass/fail thresholds (Planner 125), the x-ray machine is ready to start acquiring data from new boards. This is the "Imager" stage 135, where the operator will insert new samples into the x-ray machine for inspections based on the programming done in the previous two stages. The Imager 135 will drive the sample (or camera/sensor) to the programmed locations and take the images 140 using the parameters provided in one or more of the CAD File/Camera Settings 120 and Path File/Test Itinerary 130. The Imager 135 stage is generally referred to in the industry as the "during" production stage. These images 140 are then input to the Analyzer 145, the stage that performs all the programmed tests and determines if each test is a pass or fail. The Analyzer 145 stage is generally referred to in the industry as the "after" production stage. At the end of the Analyzer 145, a report 150 is produced with all the findings of the inspection. The latter two stages 145 and 150, including variations therein, are well understood in the industry and therefore are not elaborated herein.

The above process 100 of programing an automated x-ray machine is tedious and laborious. It also relies on the person programming the machine to know what locations in the sample are critical for the inspection, the types of defect for each location, and the thresholds for pass or fail. This requires a certain level of sample-familiarity or sample fault understanding by the operator, which means the operator must have high technical skill sets in these sample areas. Because of the reliance on the operator's knowledge/skills with the sample type, this process is prone to errors in identifying locations, determining error types, and assessing the proper thresholds.

Figure 2:
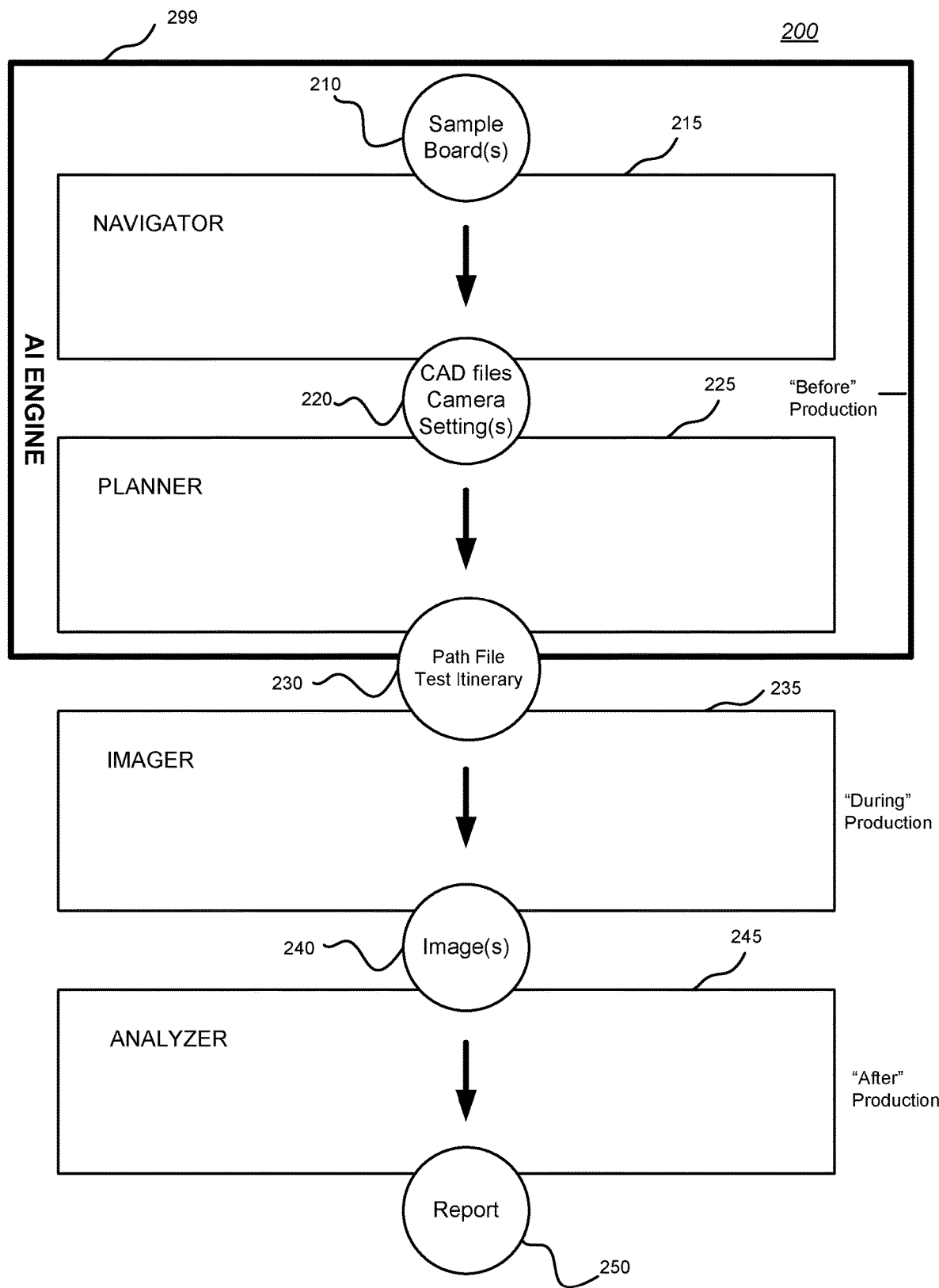
FIG. 2 is a flow diagram showing an exemplary approach for x-ray parts inspection.

FIG. 2 is a flow diagram showing an exemplary approach 200 for x-ray parts inspection, using a series of neural networks trained to identify the locations, machine values, defect types, and thresholds. This exemplary process 200 substitutes for the operator's judgment by using artificial intelligence (AI) methods learned from a library of samples with the types of parts of potential interest. The term AI here can refer to various different dynamic knowledge-based systems that have some level of ability to recognize features (e.g., image characteristics), compare results and provide appropriate direction. An AI system is understood to be different from a table-look-up, and may have an algorithm that makes "decisions," learning from past experiences. The AI engine 299, for example, may learn from an internal or external library of PCBs a wide range of possible realizations of the BGAs, different part types, and so forth. These realizations can be learnt from an internal or external library comprising optical scans or x-ray scans of many PCBs with BGAs assembled on them. (It is understood that while this description is in the context of PCB, BGAs and similar electronic type devices, the underlying process can be equally applied to other sample types, such as aircraft samples, automotive samples, etc., systems, and so forth). This training will allow the AI engine to identify these parts on samples it has never seen before. Once the parts on the sample have been correctly identified and classified, the AI algorithm can next determine what kinds of tests need to be performed in the x-ray image of that specific location. The algorithm within the AI engine is also capable of determining the correct thresholds of pass and fail for tests based on industry standards or other preset values.

Returning to FIG. 2, the AI engine 299 is integrated into both the "Navigator" 215 and "Planner" 225 stages, operating the x-ray machine to generate or populate the desired CAD file/Camera Settings for a given sample type, either identified by the AI engine 299 or identified by the operator. As a result of implementing this AI engine 299 in the programming of an automated x-ray inspection, the initial operations (e.g., programing steps) by the operator is greatly simplified, if not eliminated. For example, instead of requiring the operator to find the locations to be inspected and design the tests for each location, all the operator needs to do is to scan a new board into the system. Based on this image, the AI engine 299 identifies, classifies, and locates all locations of interest. Alternatively, the operator can input the board type (e.g., a catalog no., reference no., etc.) so as to have the AI engine 299 recognize the board features using the provided information. Further, the AI-controlled Planner 225 stage can be configured with the appropriate camera settings, test parameters, fail/pass parameters, etc. as indicated in 220 and 230. Given the initial two stages (Navigator & Planner) are linked to the AI engine 299, operator error can be greatly reduced or completely eliminated. Further, feedback to library can be provided to update the AI database for future operations.

Once the appropriate locations and tests are determined by the AI engine 299, the exemplary process 200 can process along the typical, normal procedures, if so desired, such as Imager 235, Images 240, Analyzer 245 and Report 250 (which are analogies of the operations described in FIG. 1. Here, with the AI engine 299, the operator need only insert new samples for the inspection of production samples.

In view of the above approach, it should be apparent that the AI engine 299 can also be configured to recognize a completely incorrect board type in the sample run. That is, a wrong-type board could be automatically recognized by the AI engine 299 using a predetermined threshold for identifying a board configuration or characteristic; and, if desired, the appropriate inspection parameters brought to match this errant board. Conversely, for inspection runs with different types of boards (e.g., a mix of samples), the AI engine 299, if so configured, can efficiently and rapidly "switch" between different board inspection parameters, without requiring the inspection process to appreciably slow down—a process that, if attempted by a manual operator, would be very labor intensive.

Figure 3A:
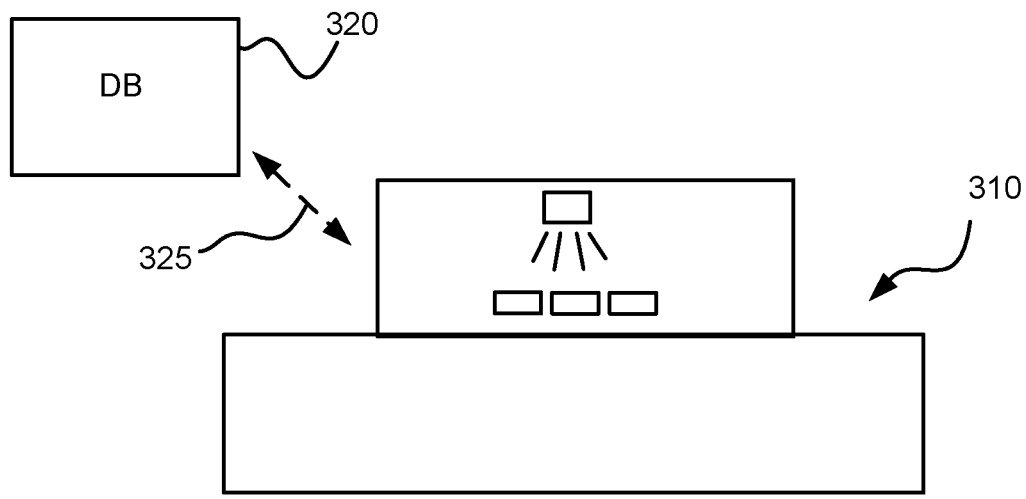
FIG. 3A is an exemplary block diagram showing an x-ray inspection machine connected to an external inspection-supporting AI database.

FIG. 3A is an illustration 300 showing an exemplary AI-enabled x-ray inspection machine 310 using an external database 320. It is understood, in the world of networked communications and databases, the AI engine described above may be off-site, residing on an external server (not shown) using database 320 containing sample and/or control parameters for operating the x-ray inspection machine 310, as well as reference images, thresholds and so forth. Communication 325 between the systems can be via network that is local or a remote network, such as the Internet.

In some embodiments, a portion of or the entirety of the AI engine may be resident (e.g., loaded) into a plurality of databases spread out over the network cloud or network accessed by the x-ray machine 310. Here, different x-ray machines 310 may have access to different databases, depending on the business model used.

Figure 3B:
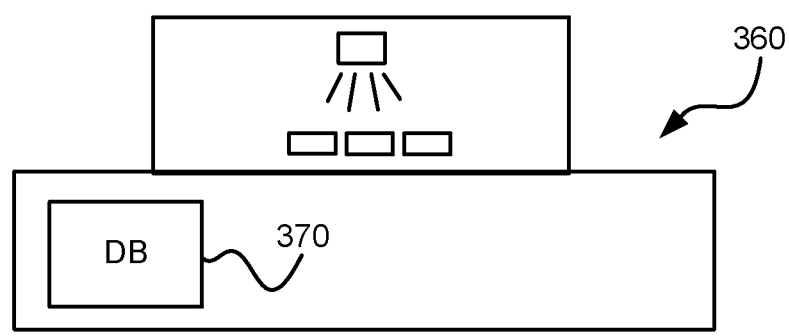
FIG. 3B is an exemplary block diagram showing an x-ray inspection machine with an internal inspection-supporting AI database.

FIG. 3B is an illustration 350 showing an exemplary AI-enabled x-ray inspection machine 360 with the AI database 370 resident on the machine 360. Here, a self-contained system is envisioned, and is understood to be self-explanatory. It should be appreciated that in some embodiments, a combination of FIGS. 3A and 3B may be implemented, wherein the AI engine or AI database is first resident on the remote databases (or conversely on the x-ray machine) and then downloaded into the x-ray machine (or conversely, uploaded from the x-ray machine to a remote database).

As will be appreciated by one skilled in the art, the various embodiments may be embodied as an apparatus that incorporates software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, microcode, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for automating programming of an industrial use x-ray inspection machine, comprising:
utilizing an artificial intelligence (AI) engine in both a navigator level and planner level stage of an x-ray parts inspection machine, the AI engine performing:
at least one of identifying and classifying a sample;
assessing location(s) to be inspected on the sample; and
implementing a test criteria for each assessed location on the sample.

2. The method of claim 1, further comprising AI engine instructions to the x-ray machine for:
moving the sample in the x-ray machine to the assessed location(s); and
generating an x-ray image of the assessed location(s).

3. The method of claim 2, further comprising applying the generated x-ray images to the test criteria to determine a quality level of the sample.

4. The method of claim 3, further comprising generating a report of the sample inspection.

5. The method of claim 1, wherein x-ray machine operation information and at least one of sample identity, sample classification, sample inspection location, and sample test criteria information is communicated to the AI engine from a remote database.

6. The method of claim 5, wherein information gathered from the sample inspection is communicated to the remote database.

7. The method of claim 1, wherein x-ray machine operation information and at least one of sample identity, sample classification, sample inspection location, and sample test criteria information is communicated locally a resident AI engine on the x-ray inspection machine.

8. The method of claim 7, wherein information gathered from the sample inspection is communicated to the local AI engine.

9. A system for automatic programming of an industrial use x-ray inspection machine, comprising:
 an artificial intelligence (AI) engine in both a navigator level and planner level stage of an x-ray parts inspection machine, the AI engine having information for:
  at least one of the identity and classification of a sample;
  an assessed location(s) to be inspected on the sample; and
  a test criteria for each assessed location on the sample.

10. The system of claim 9, further comprising AI engine instructions to the x-ray machine to:
 move the sample in the x-ray machine to the assessed location(s); and
 generate an x-ray image of the assessed location(s).

11. The system of claim 10, further comprising an imager level stage, the imager level stage generating x-ray images.

12. The system of claim 11, further comprising an analyzer level stage, the analyzer level stage comparing the generated x-ray images to the test criteria to determine a quality level of the sample.

13. The system of claim 12, further comprising a reporting module, reporting quality level of the sample.

14. The system of claim 9, further comprising a remote database, wherein x-ray machine operation information and at least one of sample identity, sample classification, sample inspection location, and sample test criteria information is communicated to the AI engine from the remote database.

15. The system of claim 14, wherein information gathered from the sample inspection is communicated to the remote database.

16. The system of claim 9, wherein the AI engine is resident on the x-ray inspection machine.

* * * * *